(12) United States Patent
Imahase et al.

(10) Patent No.: US 7,246,907 B2
(45) Date of Patent: Jul. 24, 2007

(54) PROJECTION TYPE IMAGE DISPLAY APPARATUS USING REFLECTIVE IMAGE DISPLAY ELEMENTS, REFLECTIVE POLARIZING PLATES AND AUXILIARY ANALYZERS

(75) Inventors: Taro Imahase, Fujisawa (JP); Satoshi Ouchi, Kamakura (JP); Tsutomu Nakashima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/490,256

(22) Filed: Jul. 21, 2006

(65) Prior Publication Data

US 2006/0256290 A1 Nov. 16, 2006

Related U.S. Application Data

(63) Continuation of application No. 11/102,769, filed on Apr. 11, 2005, now Pat. No. 7,090,351, which is a continuation of application No. 10/648,788, filed on Aug. 27, 2003, now Pat. No. 6,893,131.

(30) Foreign Application Priority Data

Dec. 6, 2002 (JP) ............................. 2002-354501

(51) Int. Cl.
  G03B 21/00 (2006.01)
  G03B 21/14 (2006.01)
  G03B 21/26 (2006.01)
  G03B 21/28 (2006.01)
  G02F 1/1335 (2006.01)

(52) U.S. Cl. ...................... 353/20; 353/31; 353/34; 353/37; 353/98; 353/99; 349/9

(58) Field of Classification Search .................. 353/20, 353/31, 34, 37, 81, 84, 98, 99; 349/9
See application file for complete search history.

(56) References Cited

U.S. PATENT DOCUMENTS

| 5,526,147 A | 6/1996 | Omae et al. |
| 6,183,090 B1 | 2/2001 | Nakanishi et al. |
| 6,234,634 B1 | 5/2001 | Hansen et al. ................ 353/20 |
| 6,262,851 B1 | 7/2001 | Marshall .................... 359/634 |
| 6,623,125 B2 | 9/2003 | Chen et al. .................. 353/52 |

(Continued)

FOREIGN PATENT DOCUMENTS

CN 1195782 10/1998

(Continued)

OTHER PUBLICATIONS

ProFlux "Optically Flat Polarizing Beamsplitters", Catalog No. PBF02A, May 2002; 2 pgs.

*Primary Examiner*—Melissa Jan Koval
(74) *Attorney, Agent, or Firm*—McDermott Will & Emery LLP

(57) ABSTRACT

A compact, light projection type image display apparatus based on reflection image display devices which provide high brightness without contrast deterioration caused by light leakage associated with black image display. The apparatus uses, as polarizers/analyzers for reflection image display devices, reflection polarizing plates which function as polarizing plates by their grating function only in a specific direction. In each light path, the reflection polarizing plate is located just before/after the reflection image display device.

10 Claims, 5 Drawing Sheets

U.S. PATENT DOCUMENTS

| | | | |
|---|---|---|---|
| 6,666,556 B2 * | 12/2003 | Hansen et al. ................. | 353/20 |
| 6,666,557 B1 | 12/2003 | Chol ........................... | 353/31 |
| 6,698,896 B2 | 3/2004 | Suzuki et al. | |
| 6,776,489 B2 | 8/2004 | Suzuki ........................ | 353/20 |
| 6,781,640 B1 | 8/2004 | Huang | |
| 6,817,720 B2 | 11/2004 | Shiraishi et al. ............... | 353/61 |
| 6,893,131 B2 | 5/2005 | Imahase et al. ............... | 353/31 |
| 6,910,773 B2 * | 6/2005 | Nakashima et al. .......... | 353/20 |
| 7,066,600 B2 * | 6/2006 | Nakashima et al. .......... | 353/20 |
| 7,090,351 B2 | 8/2006 | Imahase et al. ............... | 353/20 |
| 2004/0066492 A1 | 4/2004 | Nakashima et al. .......... | 353/20 |

FOREIGN PATENT DOCUMENTS

| | | |
|---|---|---|
| EP | 1146379 | 10/2001 |
| GB | 2 373 592 A | 9/2002 |
| JP | 4-427 | 1/1992 |
| JP | 6-11681 | 1/1994 |
| JP | 11-15074 | 1/1999 |
| JP | 2000-165898 | 6/2000 |
| JP | 2001-215461 | 8/2001 |
| JP | 2001-249403 | 9/2001 |
| JP | 2002-287094 | 10/2002 |

* cited by examiner

PROJECTION TYPE IMAGE DISPLAY APPARATUS USING REFLECTIVE IMAGE DISPLAY ELEMENTS, REFLECTIVE POLARIZING PLATES AND AUXILIARY ANALYZERS

RELATED APPLICATION

This application is a continuation of Ser. No. 11/102,769, filed Apr. 11, 2005, now U.S. Pat. No. 7,090,351 which is a continuation of Ser. No. 10/648,788, filed Aug. 27, 2003, now U.S. Pat. No. 6,893,131, which claims priority of Japanese Patent application No. 2002-354501, filed Dec. 6, 2002, and the contents of which are herewith incorporated by reference.

BACKGROUND OF THE INVENTION

The present invention relates to a projector which projects an image on a screen using reflection liquid crystal panels such as a reflection liquid crystal projector, a projection type image display apparatus such as a reflection liquid crystal rear projector, and a projection type image display apparatus optical unit.

An optical unit for a reflection liquid crystal projector which uses reflection liquid crystal panels is explained next. Non-polarized light coming from a light source is linearly polarized by a polarization converter and cast on a polarizer. The unwanted polarized component is removed from the light by the polarizer before it reaches a reflection liquid crystal panel. The light is modulated by the reflection liquid crystal panel so that its polarization state is changed on a pixel-by-pixel basis according to image signal. Then, it reaches an analyzer. The quantity of light which is transmitted or reflected by the analyzer is determined according to the polarization state of the light emitted from each pixel. An image thus obtained is projected in an enlarged form by a projection lens. A polarizing beam splitter prism (hereinafter called a PBS prism) is commonly used as a polarizer/analyzer. A PBS prism has a dielectric multilayer film (hereinafter called a PBS film) which transmits p-polarized light and reflects s-polarized light.

In a reflection type liquid crystal projector which uses a PBS prism as a polarizer/analyzer, light leakage from the PBS prism occurs for the following reason when a black image is displayed. The s- and p-polarization directions of light rays which are not parallel to the main incidence (entrance) plane are different between when they are transmitted or reflected by the PBS prism and when they reenter the PBS prism after being reflected by the reflection liquid crystal panel. However, after being transmitted or reflected by the PBS prism, rays retain their polarization direction when they reenter the prism. Therefore, rays parallel to the main incidence plane are completely transmitted or reflected when they reenter the prism; on the other hand, for rays which are not parallel to the main incidence plane, the s-polarized component is reflected and the p-polarized component is transmitted. For this reason, rays which are not parallel to the main incidence plane may cause light leakage, resulting in black image contrast deterioration.

Also, a contrast improvement method which uses a quarter-wave plate between a projection lens and a cross dichroic prism has been suggested.

However, in the case that a PBS prism is used as a polarizer/analyzer for a reflection type liquid crystal panel as mentioned above, even when a quarter-wave plate is disposed just before the panel in order to prevent contrast deterioration, the effect of the quarter-wave plate is not satisfactory. A wave plate has specific wavelength and angle characteristics. As the difference of the incident light wavelength from the design center wavelength increases or the incidence angle increases, the performance of the wave plate decreases, so light leakage cannot be prevented completely and contrast deterioration will occur. Even when a polarizing plate is disposed between the PBS prism and the projection lens for the purpose of preventing leak light from being projected on the screen, it is impossible to prevent light leakage completely because the leak light includes rays polarized in the same direction as the direction of the polarizing plate transmission axis.

Besides, the use of the PBS prism is disadvantageous from the viewpoint of weight. Furthermore, when the PBS prism uses a glass material with a low photoelastic coefficient to avoid birefringence which might cause contrast deterioration, it may be relatively heavy because of the relatively large specific gravity of the glass material, and costly because the material is not widely available on the market.

SUMMARY OF THE INVENTION

The present invention has been made in view of the above problems and provides a light, compact reflection type image display apparatus which uses reflection image display devices to deliver satisfactory image quality performances such as brightness, high contrast, and high resolution.

In order to solve the above problems, the invention provides a projection type image display apparatus which comprises the following: a lamp unit which emits light; three reflection image display devices as light valve means which make an optical image according to an image signal; a color separation system which separates light from the lamp unit into three color light components and lets them impinge on the corresponding color reflection image display devices; a color combining system which combines the three color light components from the reflection image display devices; and a projection means which projects a color-combined optical image. In addition, the apparatus has: flat reflection polarizing plates as polarizers/analyzers for the reflection image display devices which, by their diffraction function, reflect primary light polarized in a specified direction and transmit secondary light polarized in a direction virtually perpendicular to the specified direction; and auxiliary analyzers which transmit either the primary polarized light or the secondary polarized light on the exit side of the reflection polarizing plates. Here, the color combining system consists of a color combining prism and three color light components resulting from color separation by the color separation system reach the reflection image display devices through the reflection polarizing plates and the reflected light which constitutes an optical image made by the reflection image display devices enters the color combining system through the reflection image display devices.

BRIEF DESCRIPTION OF THE DRAWINGS

The invention will be more particularly described with reference to the accompanying drawings, in which.

DETAILED DESCRIPTION OF THE PREFERRED EMBODIMENTS

Next, preferred embodiments of the present invention will be described, referring to the accompanying drawings.

Figure 1:
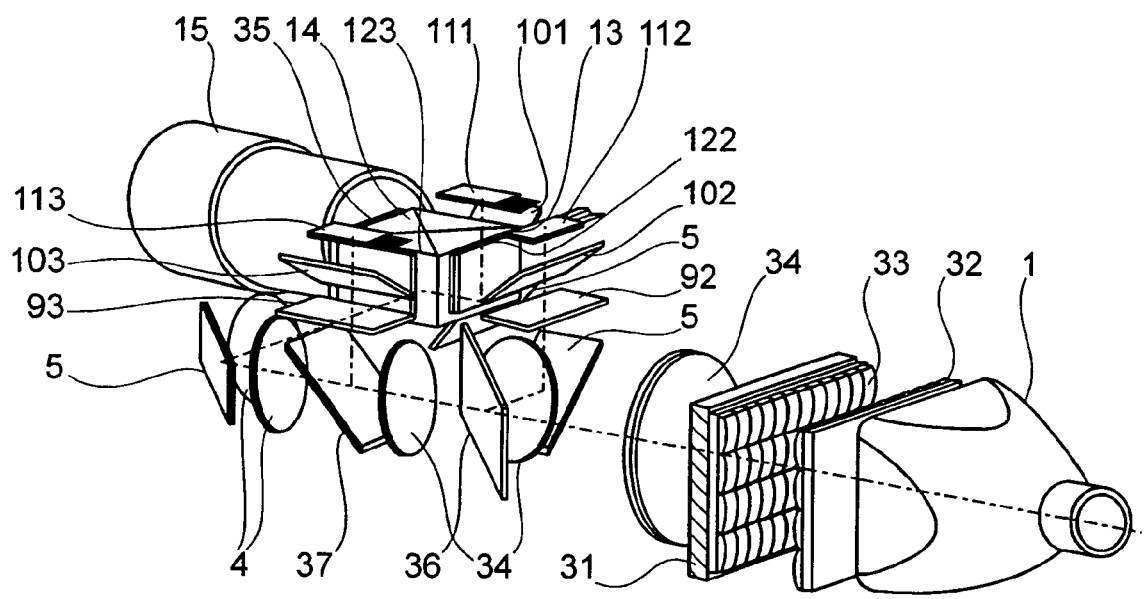
FIG. 1 shows the general structure of a projection type liquid crystal display apparatus according to a first embodiment of the present invention.

FIG. 1 shows a reflection liquid crystal projector optical unit according to an embodiment of the present invention. A projection type image display apparatus 22 has a lamp unit (light source) 1 which incorporates a lamp 1a. The lamp 1a is a white lamp such as a ultra-high pressure mercury lamp, metal halide lamp, xenon lamp, mercury xenon lamp or halogen lamp. Light emitted from the lamp 1a in the lamp unit 1 is condensed and reflected by an ellipsoidal, parabolic or aspheric surface reflector 1b. Since the lamp unit 1 becomes hot due to the heat of the lamp 1a, it is cooled by a cooling fan 40 behind it.

The light coming from the lamp unit 1 impinges on a first lens array 32. The first lens array 32 consists of plural condenser lenses disposed in a rectangular frame which has the almost same size as the exit opening of the reflector 1b. It condenses the light from the lamp unit 1 and makes plural secondary lamp images. Then, the light from the first lens array 32 passes through a second lens array 33. The second lens array 33, which consists of plural condensers, is located near the spot where the plural secondary lamp images are made. The second lens array 33 focuses individual lens images of the first lens array 32 on reflection liquid crystal panels 10. The first lens array 32 and the second lens array 33 have vertically long cells to bend the light path vertically so that light will be later cast on reflection image display devices. The light emitted from the second lens array 33 enters a polarization converter 31 which consists of an array of rhomboidal prisms. The rhomboidal prisms are disposed so as to match the vertical pitch of the optical axes of the lenses of the second lens array 33 and the size of each prism is almost one half of the lens width.

There is a polarization/separation film on the prism surface. The incident light is separated into p-polarized light and s-polarized light by this polarization/separation film. The p-polarized light passes through the polarization/separation film and leaves the prism. On the other hand, the s-polarized light is reflected by the polarization/separation film and again reflected towards the original optical axis inside an adjacent rhomboidal prism; then it is rotated 90 degrees to be converted into p-polarized light by a half-wave plate disposed on the exit plane of the prism before leaving the prism. A collimator lens 34 has a positive refractive power and provides a light-condensing function. The light is cast on three color (R, G, and B) reflection liquid crystal panels 11.

This structure has two stages. The light is color separated by an RB-transmission G-reflection dichroic mirror 36 into RB light and G light. Then, the G light is reflected upwards by a white reflection mirror 5. An R-transmission B-reflection dichroic mirror 37 transmits B light and reflects R light upwards to separate the RB light into R light and B light. The B light passes through lenses 4 and reaches the reflection mirror 5 where it is reflected upwards. The separated R, G and B light rays in the three light paths respectively pass through an auxiliary polarizer for R (not shown), an auxiliary polarizer for G 92, and an auxiliary polarizer for B 93; then through a reflection polarizing plate for R (polarization separator) 101, a reflection polarizing plate for G (polarization separator) 102, and a reflection polarizing plate for B (polarization separator) 103 before reaching a reflection liquid crystal panel for R 111, a reflection liquid crystal panel for G 112, and a reflection liquid crystal panel for B 113.

Reflection polarizing plates 10 are almost rectangular and their short sides are inclined approx. 45 degrees with respect to the optical axis. The distance from each reflection liquid crystal panel 11 to the corresponding reflection polarizing plate 10 can be shortened and thus the back focus of the projection lens can be shortened. This mitigates astigmatism in the projection lens.

Each reflection liquid crystal panel 11 has as many liquid crystal display areas with an aspect ratio of 16:9 as pixels to be displayed (for example, 1,900 pixels in the horizontal direction and 1,080 pixels in the vertical direction). The phase angle of polarized light in each pixel on the panel 11 is varied according to externally driven signal. Light whose polarization direction is matched is analyzed by a reflection polarizing plate and an auxiliary analyzer. Regarding light whose polarization direction is half-matched, the quantity of light to be analyzed is determined depending on the degree of polarization of the reflection polarization plate and auxiliary analyzer. An image is displayed according to external signal in this way. For black display of the reflection liquid crystal panels 11, the polarization direction is virtually the same as the direction of incident light and the light goes back along the incident light path to the lamp.

In each color light path, the optical axis of the reflection plane of each reflection liquid crystal panel 11 is virtually perpendicular to the optical axis of each color light entrance (incidence) plane of a cross dichroic prism 14 and in the vicinity of the spot where both optical axes cross virtually perpendicularly, there is a reflection polarizing plate 10 (inclined approximately 45 degrees with the corresponding optical axis). In this structure, optical components (from the reflection polarizing plate to the auxiliary analyzer) disposed in the color light paths of the cross dichroic prism 14 are symmetrical and almost equal among the light paths when viewed from the entrance plane of the cross dichroic prism 14. From the viewpoint of image focusing, the light path lengths from the panels 11 to the projection lens 15 must be almost equal, so this symmetrical disposition minimizes interference between the components or the light paths, which makes design work easy. Also, space can be efficiently used and the unit size can be reduced.

The rays reflected by the R, G, and B light reflection liquid crystal panels are respectively reflected by R, G, and B light reflection polarizing plate 101, 102, 103 and rotated approximately 90 degrees and transmitted by R, G, and B light auxiliary analyzers 121, 122, 123; then G rays are transmitted by a half-wave plate for G 13 to be converted into p-polarized light before all R, G and B rays enter the cross dichroic prism 14.

The reflection plane optical axes of the three reflection liquid crystal panels 11 are oriented in the same way and the three reflection planes are almost equal in height with one of them as the reference plane. This makes it possible to make pixel position adjustments of the three panels 1 and fit the panels 11 to the respective panel holders after the adjustments, using a special tool (jig) in the same direction more easily. Therefore, working time is shortened and the cost is reduced. If a tool has a rotary mechanism, all the panels 11 can be adjusted using it. This also implies reduction in the tool designing and manufacturing cost.

Since there is no light path on the rear (lower) side of each of the reflection liquid crystal panels, a radiation board may be attached thereon to cool the panel. In this embodiment, one cooling fan (not shown) disposed on the upper side may be sufficient to cool the three reflection liquid crystal panels efficiently.

The three reflection liquid crystal panels 11 are located near and above the upper side of the cross dichroic prism 14 which is not used as a light path. This prevents interference between the panels 11 or the panel holders and the cross dichroic prism 14 and allows the use of a smaller optical engine.

The reflection polarizing plates 10 are fixed in position with their reflection surfaces held against three protrusions on the chassis by means of leaf springs, etc. in the opposite direction. The angle of the reflection plane surfaces of the reflection polarizing plates 10 which reflect light coming from the panels must be strictly controlled because it affects the image position on the screen. Since this chassis is manufactured by molding, it is easy to control the positions and shape of the three protrusions with high accuracy in the chassis mass production process. The reflection plane angle can be controlled accurately by pushing and holding the reflection plane surfaces directly against these three protrusions.

Figure 2:
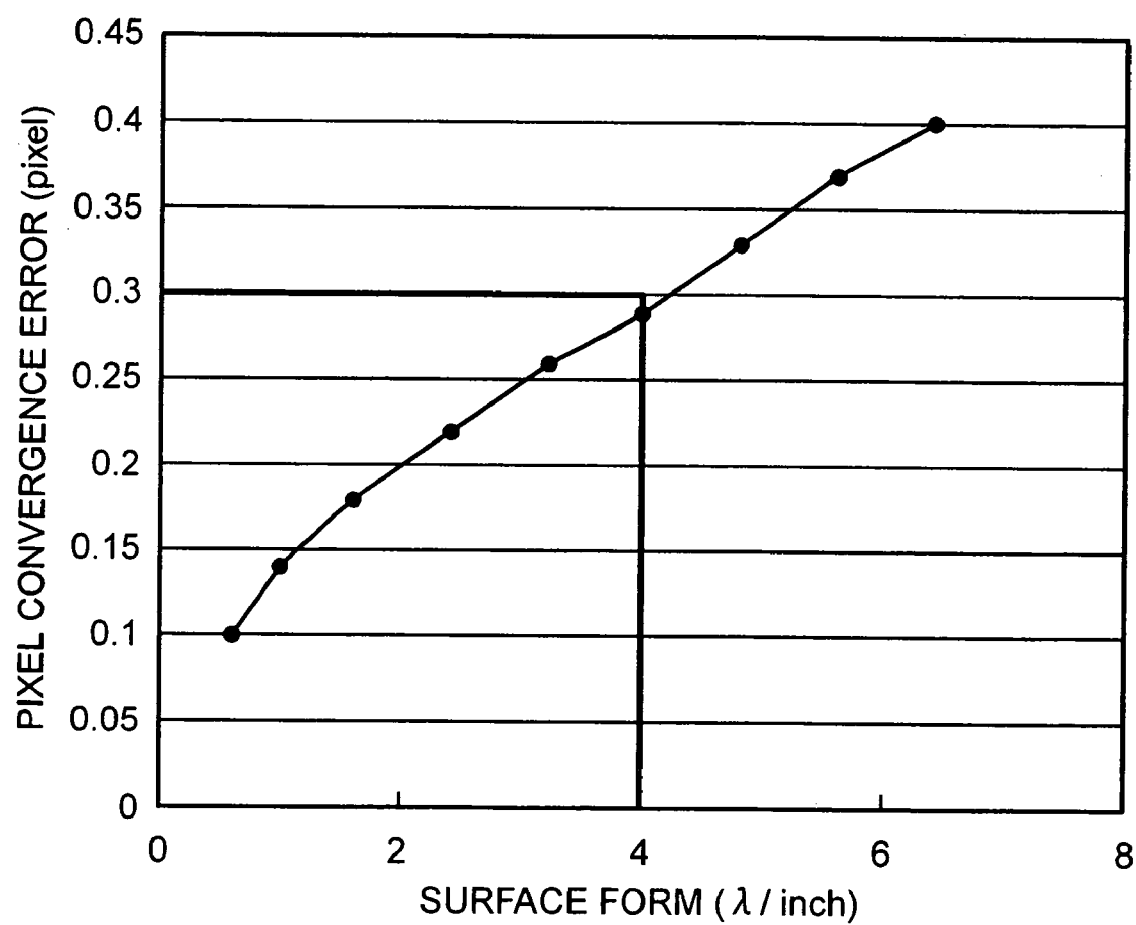
FIG. 2 is a graph showing the relation between the reflection polarizing plate surface form and pixel convergence errors, as a result of light ray tracking simulation.

In this embodiment, the surface forms of the R, G, and B light reflection polarizing plates 101, 102, and 103 are such that the difference between one of them (reference plate) and the other plates is within ±3 ($\lambda$/inch). Light which has exited a reflection liquid crystal panel 11 is reflected by a reflection polarizing plate 10. If a reflection polarizing plate is concave or convex, the plate functions as a lens and affects the image quality on the screen. For this reason, the surface forms of the reflection polarizing plates 10 must be controlled. For a structure which uses three such panels, it is particularly important to use one polarizing plate as a reference and minimize the surface form differences of the other two plates from the reference plate in order to assure a high image focusing performance. FIG. 2 shows the relation between the reflection polarizing plate surface form and pixel convergence errors, as a result of result of light ray tracking simulation. The graph suggests that the plate surface form difference should be within ±4 ($\lambda$/inch) in order to keep pixel convergence errors 0.3 pixel or less. Preferably, the difference should be within ±3 ($\lambda$/inch); in order to avoid image quality deterioration, it should be at least within ±4 ($\lambda$/inch). If the surface is not flat, the projection lens focus adjusting function can be used to compensate for it to some extent. Alternatively, for the purpose of facilitating component management and selection, it is also acceptable that all the three reflection polarizing plates have convex or concave reflection surfaces.

Generally, chromatic aberration (image focusing performance index) depends on wavelength and this index becomes better or worse in the order of R, G, and B. In other words, G always takes the center value. Hence, it is reasonable to use the reflection polarizing plate for G as a reference and keep the differences from the reference within Newton ±3 $\lambda$.

Regarding the auxiliary polarizers 9, reflection polarizing plates 10, and auxiliary analyzers 12, as the contrast ratio is increased, the transmittance is decreased, and vice versa. This implies a tradeoff between contrast and brightness in terms of projection type image display apparatus performance. Not a single component but a plurality of components are used to assure satisfactory contrast: the auxiliary polarizers 9, reflection polarizing plates 10, and auxiliary analyzers 12. In accordance with the rule mentioned below, these optical components may be combined so as to assure high efficiency and high contrast in the projection type image display apparatus.

The contrast ratio of an optical system is calculated from the following formula:

1/(optical system contrast ratio)=1/(optical system contrast ratio on the panel entrance side)+1/(optical system contrast ratio on the panel exit side)

This formula indicates that brightness and contrast cannot be improved efficiently if only the optical system contrast ratio on the panel entrance or exit side is improved. Balancing between the entrance and exit side contrast ratios is the best way to optimize both brightness and contrast. The optical system contrast ratio is calculated as the product of contrast ratios of components. When the contrast ratio of the auxiliary polarizers is expressed by A; that of the auxiliary analyzers by D; and the transmission contrast ratio and reflection contrast ratio of the reflection polarizing plates by B and C, respectively, the entrance side optical system contrast ratio is calculated by A*B while the exit side optical system contrast ratio is calculated by C*D. Therefore, for the purpose of balancing, the auxiliary polarizers, auxiliary analyzers, and reflection polarizing plates should meet the following relation: A*B=(0.1–10)*C*D. When no auxiliary polarizers or analyzers are used, the above relation should be met where 1 should be substituted for their contrast ratio.

Next is a method of measuring the contrast ratio of an absorption polarizing plate which is used as an auxiliary polarizer/analyzer. A measuring light source emits light. Due to an aperture behind the light source, the divergence of the beam which reaches the object to be measured is expressed as nearly F20. Located after the light source is a measuring polarizing plate whose transmission axis is aligned to transmit p-polarized light for characteristic measurement of p-polarized light or s-polarized light for characteristic measurement of s-polarized light. The object to be measured is located after it to make a measurement. The light passes through the object and reaches a measuring light receiver where the spectral distribution of the transmitted light is measured. The transmittance for the transmission axis of the absorption polarizing plate is measured in two modes: an s-polarized light transmittance measuring mode and a p-polarized light transmittance measuring mode. Brightness is calculated by multiplying the spectral distribution of measured transmittances by spectral luminous efficacy. Hence, theoretically brightness is calculated by wavelength integration $\int T(\lambda)*A(\lambda)d\lambda$ where transmittance and spectral luminous efficacy in the wavelength band used are respectively expressed by $T(\lambda)$ and $A(\lambda)$. Since actually measured transmittance $T(\lambda)$ values are not continuous, brightness is calculated by summation of $T(\lambda)*A(\lambda)d\lambda$ in the wavelength band used. In the case of reflection, reflectance $R(\lambda)$ should be used instead of transmittance $T(\lambda)$. When the absorption polarizing plate is adjusted for transmission of p-polarized light, the contrast ratio is calculated as (brightness of p-polarized light)/(brightness of s-polarized light). When the absorption polarizing plate is adjusted for transmission of s-polarized light, the contrast ratio is calculated as (brightness of s-polarized light)/(brightness of p-polarized light).

Next is a method of measuring the contrast ratio of a reflection polarizing plate. The transmission axis of the reflection polarizing plate is inclined 45 degrees with respect to the optical axis for p-polarized light. Measurements are made to obtain spectral distributions concerning transmission and reflection of incident s-polarized and p-polarized light. Since the transmission axis is adjusted for p-polarized light, the transmission contrast ratio is expressed by (brightness of p-polarized light)/(brightness of s-polarized light) and the reflection contrast ratio by (brightness of s-polarized light)/(brightness of p-polarized light).

Generally speaking, regarding the reflection polarizing plate, its transmission contrast ratio of p-polarized light is higher than its reflection contrast ratio of s-polarized light. Hence, if the contrast ratio of the auxiliary analyzers is higher than the contrast ratio of the auxiliary polarizers, higher efficiency and higher contrast can be achieved. In other words, when the transmittance of the auxiliary analyzers is lower than that of the auxiliary polarizers, higher efficiency and higher contrast can be achieved.

The display area of the reflection liquid crystal panels 11 is supported by a structure (not shown) which is asymmetric as viewed from the center of the display area. The reflection liquid crystal panels 11 are disposed so that the short side of the structure is nearer to the cross dichroic prism 14 as viewed from the center of the display area. This makes it possible to dispose the reflection liquid crystal panels 11 nearer to the cross dichroic prism 14, so the apparatus size can be reduced and the distance from the reflection liquid crystal panels 11 to the cross dichroic prism 14 can be shortened. Consequently, the back focus of the projection lens 15 can be shortened and astigmatism can be mitigated.

In another embodiment, on the entrance side of the reflection polarizing plates, there is a polarization/separation prism 38 which reflects s-polarized light (virtually linearly polarized light), and transmits p-polarized light (virtually linearly polarized light) which is virtually perpendicular to it. Unlike the film auxiliary polarizers 9, the polarization/separation prism 38 is heat-resistant and eliminates the need for cooling by a cooling fan, so noise is reduced.

Figure 3:
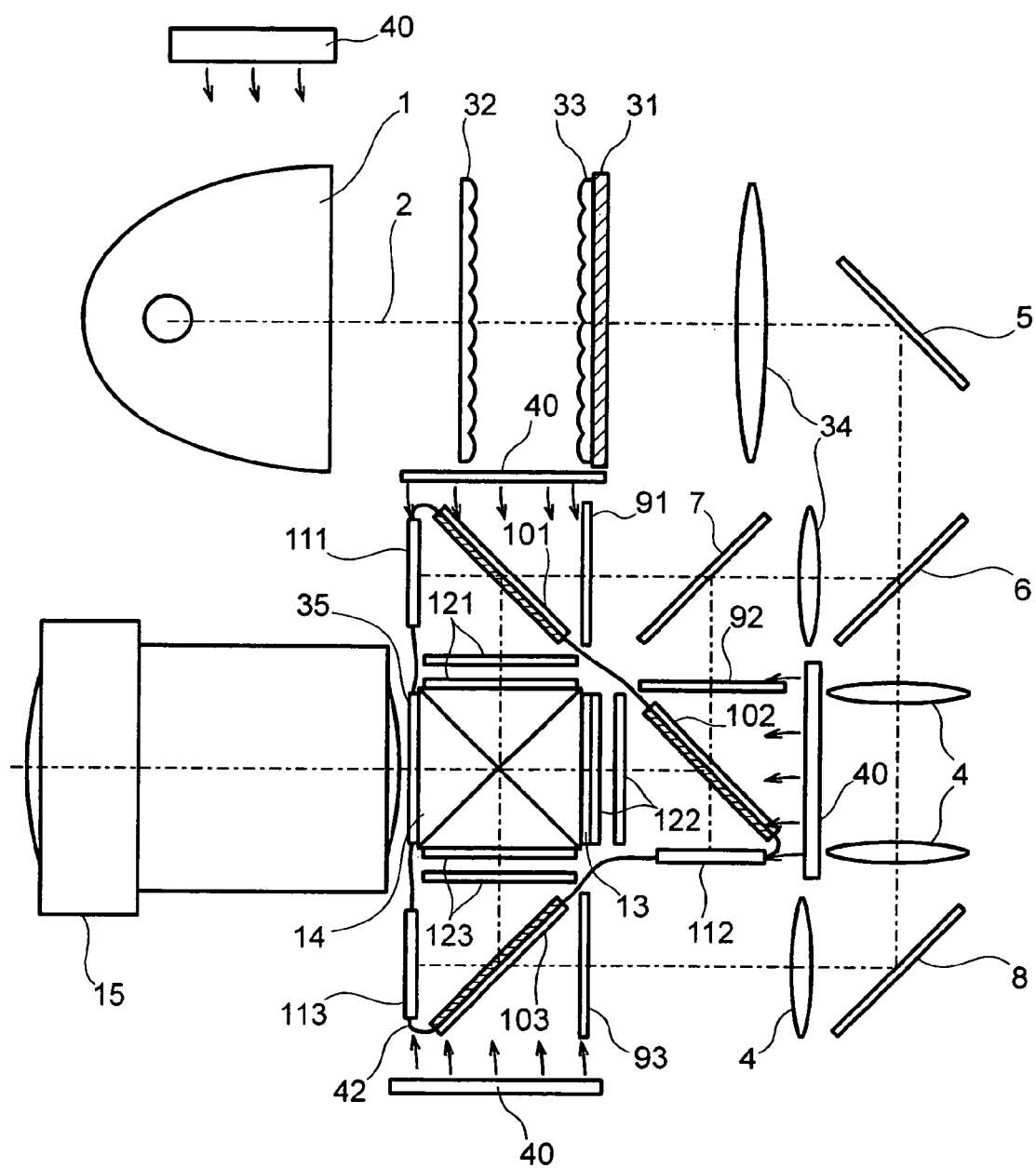
FIG. 3 shows the general structure of a projection type liquid crystal display apparatus according to a second embodiment of the present invention.

Next, a second embodiment of the invention will be described referring to FIG. 3.

The portion from the lamp unit 1 to the collimator lens 34 is the same as in the embodiment shown in FIG. 1 except that the first lens array and the second lens array have horizontally long cells and a polarization converter 31 is disposed in a way to match vertical pitches and the light path is bent approximately 90 degrees by the reflection mirror 5.

Light is separated into R (red), G (green), and B (blue) light by dichroic mirrors 6 and 7. Then, B light rays are bent 90 degrees by a B-reflection mirror 17. R, G, and B light respectively pass through R, G, and B light auxiliary polarizers 91, 92, 93, then through R, G, and B light reflection polarizing plates 101, 102, 103 and respectively reach R, G, and B light reflection liquid crystal panels 111, 112, 113. The rays reflected by the R, G, and B light reflection liquid crystal panels are reflected and bent 90 degrees by the R, G, and B light reflection polarizing plates 101, 102, and 103 respectively, then transmitted through R, G, and B light auxiliary analyzers 121, 122, 123. G light is transmitted by a half-wave plate for G 13 and converted into p-polarized light and all R, G, and B light rays enter the cross dichroic prism 14. R, G, and B light rays are combined into white and projected on the screen in enlarged form by the projection lens 15.

In this embodiment, contrast is improved with respect to oblique incident light by a viewing angle compensation retardation film (not shown) located just before a reflection liquid crystal panel.

An explanation of a reflection polarizing plate is given below. A reflection polarizing plate, which functions as a polarizing plate by its grating function in a specific direction only, reflects polarized light parallel to the grating and transmits polarized light perpendicular to the grating. The contrast ratio is almost equal in regard to any light rays on a plane including the polarizing plate's transmission axis and its normal and on a plane including the polarizing plate's absorption or reflection axis and its normal. This structure has no possibility of light leakage which might occur in a structure with a PBS prism before or after the panels, and high contrast is achieved with no additional component such as a quarter-wave plate. Most leak light from the PBS prism is polarized in the same direction as the direction of the transmission axis of the polarizing plate, so it would be impossible to prevent light leakage completely even when a polarizing film (analyzer) is placed between the projection lens and the reflection liquid crystal panel. On the other hand, when a reflection polarizing plate is employed instead, light leakage is often caused by a low contrast ratio of the reflection polarizing plate; therefore, the use of an auxiliary polarizer and an auxiliary analyzer in such a situation prevents most of light leakage, leading to a higher contrast.

A cooling fan 40 cools auxiliary polarizers 9, reflection polarizing plates 10, reflection liquid crystal panels 11 and auxiliary analyzers 12. Since the auxiliary polarizers 9 and the auxiliary analyzers 12 are both made of an absorptive film material, they must be cooled down to approximately 70 degrees Celsius or less. In black display, the auxiliary analyzers 12 receive unwanted light which has been once intercepted by the reflection polarizing plates 10 located on their entrance side, and thus absorb little unwanted light. By contrast, the auxiliary polarizers 9 directly receive light which contains unwanted light and thus absorb more unwanted light and generate more heat. For this reason, the auxiliary polarizers 9 must be more cooled than the auxiliary analyzers 12. The cooling fan is positioned or its air duct is designed so that cooling air blows towards the auxiliary polarizers 9 more strongly than towards the auxiliary analyzers 12

An exit quarter-wave plate 35 is attached to the exit plane of the cross dichroic prism 14. Since the exit quarter-wave plate 35 is to be located in the combining light path, it should be a wideband quarter-wave plate. The angle θ of the lag axis 35a of the exit quarter-wave plate 35 with respect to the absorption axis 12a of the corresponding auxiliary analyzer 12 should be almost within the range of 40 to 50 degrees or −40 to −50 degrees. In this embodiment, the angle is set to approximately 45 degrees. If the contrast ratios of the auxiliary polarizers 9 and reflection polarizing plates 10 are insufficient and the contrast ratio for incident light on the reflection liquid crystal panels 11 is low, or the phase difference given by the reflection liquid crystal panels 11 for black display is inadequate, the light emitted from the panels 11 for black display contains s-polarized light which cannot be intercepted by the reflection polarizing plates 10 and auxiliary analyzers 12. s-polarized light passes through the reflection polarizing plates 10 and auxiliary analyzers 12 and impinges on the projection lens 15. The projection lens 15 consists of many lenses and its total transmittance is 85% or so, which means that it reflects 15% of light which it receives. If no exit quarter-wave plate 35 is provided, this reflected light enters as virtually s-polarized light which is inclined 90 degrees from virtually p-polarized light which the reflection liquid crystal panels 14 are to receive. For black display on the panels, outgoing light, which remains virtually s-polarized, cannot be intercepted by the reflection polarizing plates 10 and auxiliary analyzers 12; it goes through the projection lens 15 and reaches the screen, resulting in contrast deterioration. If an exit quarter-wave plate 35 is provided as in this embodiment, virtually s-polarized leak light is transmitted by the exit quarter-wave plate 35 with a lag axis inclined nearly 45 degrees and reflected by the projection lens 15 and again transmitted by the exit quarter-wave plate 35 while it is converted into virtually p-polarized light. Therefore, it is absorbed by the auxiliary analyzers 12, resulting in contrast improvement.

On the cross dichroic prism 14, an exit quarter-wave plate 35 is attached to its exit plane for combined light, an auxiliary analyzer for R 121 to the entrance plane for the R light path, an auxiliary analyzer for B to the entrance plane for the B light path, and a half-wave plate for G 13 to the entrance plane for the G light path. In other words, wave plates or polarizing plates are attached to all four light path planes. The cross dichroic prism 14 must be made with high precision so that pixel convergence errors on the screen are minimized. The cross dichroic prism 14 is made by bonding four triangular prisms together. The apexes of these prisms are frangible and must be carefully handled. When all the four planes are bonded together as mentioned above, the troublesome AR (antireflection coating) process for the prism 14 can be eliminated, leading to cost reduction. In the AR process, the prism 14 is heated and residual stress occurs in it. To improve contrast, reflected light from the projection lens 15 is rotated by the exit quarter-wave plate 35 and absorbed by the corresponding auxiliary analyzer 12. If there should be residual stress in the prism 14, birefringence would occur and result in black unevenness. On the other hand, if wave plates or polarizing plates are bonded to all the four planes, the AR process is eliminated for all the four triangular prisms and residual stress in the prism 14 is decreased and black unevenness is reduced. Because all the four prisms have the same level of residual stress, they expand almost equally as they receive light. Therefore, angle discrepancy from the initial positions on the blue and red light reflection planes of the cross dichroic prism 14 is small. Hence, the amount of pixel convergence error that arises on each panel during use is smaller. Since the prisms are bonded together, there is less interface with the air, which prevents contrast deterioration attributable to reflection on the interface. The exit quarter-wave plate 35 is made of crystal. It causes less in-plane change in heat-induced birefringence than a film-based quarter-wave plate, thereby reducing black unevenness.

The reflection polarizing plates 10 separate light into p-polarized light and s-polarized light using the effect of diffraction grating whose pitch is shorter than the wavelength of light. Contrast is poorer for the B light path with relatively short wavelengths than for the R and G light paths. So, the contrast for the B light path is improved by using the diffraction grating pitch only for the reflection polarizing plate 10 in the B light path which is shorter than that for the reflection polarizing plate in the R light path.

In addition, for contrast balancing among the three colors and better black display, the auxiliary polarizers 93 and auxiliary analyzer 123 for the B light path are designed to have higher contrast ratios than the auxiliary polarizers 91 and auxiliary analyzer 121 for the R light path and the auxiliary polarizers 92 and auxiliary analyzer 122 for the G light path.

Here, each auxiliary analyzer 12 has a double plate structure to increase its heat resistance. The required cooling air flow rate is lower and, therefore, the required cooling fan speed is lower, so the wind noise of the cooling fan is reduced, allowing quiet operation.

Figure 4:
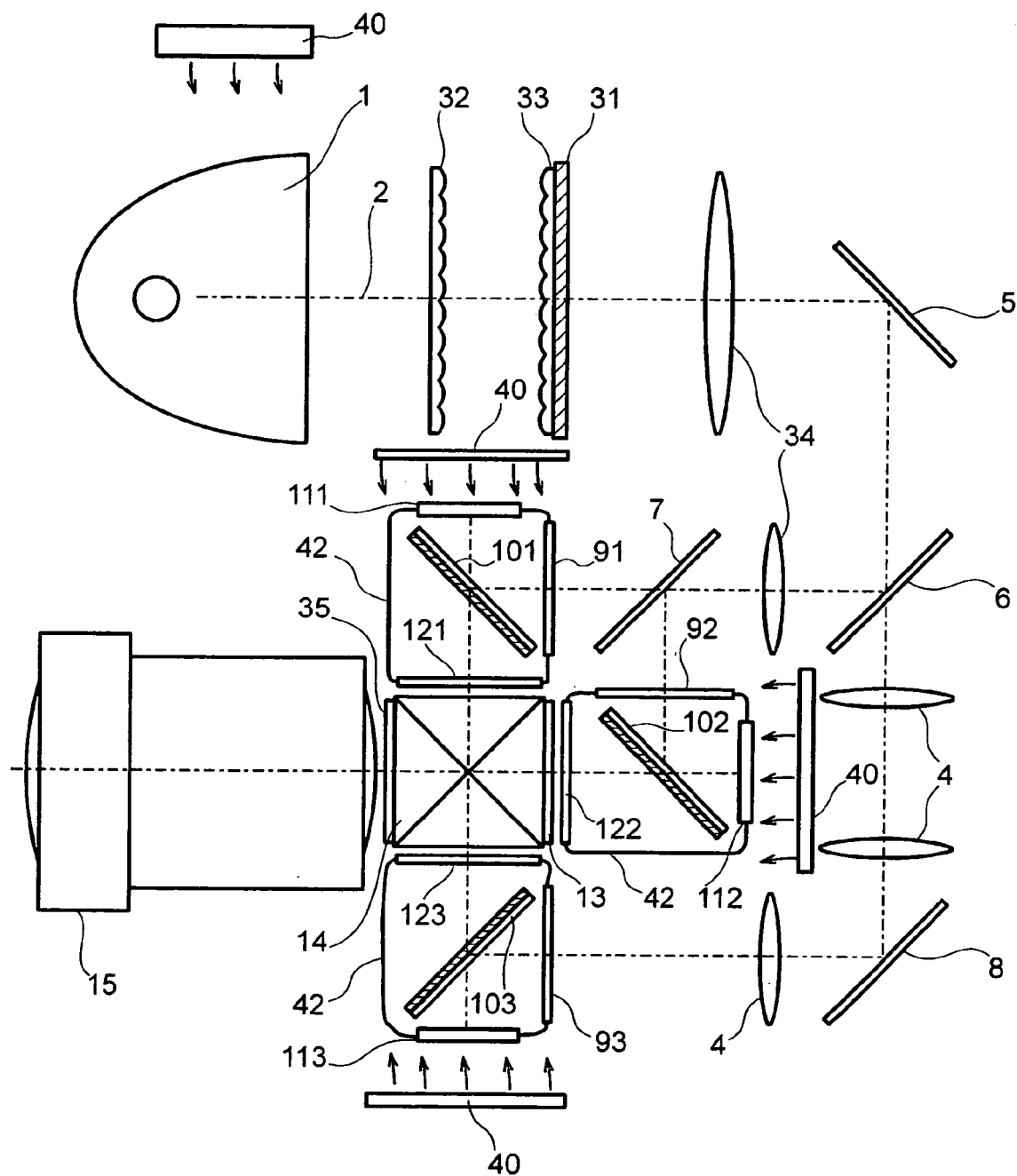
FIG. 4 shows the general structure of a projection type liquid crystal display apparatus according to a third embodiment of the present invention.

FIG. 4 shows a third embodiment of the present invention. The structure is the same as that of the embodiment illustrated in FIG. 3 except the following points. The reflection polarizing plates 10, reflection liquid crystal panels 11 and auxiliary analyzers 9 are located on the surface of the hermetically sealed chassis 42 which borders on the outside. Because the hermetically sealed chassis 42 are dustproof, they prevent dust adhesion on the reflection polarizing plates 10, reflection liquid crystal panels 11, etc., so that on-screen image missing or image quality deterioration may not occur. The use of optical components such as the reflection polarizing plates 10 and auxiliary analyzers 9 as boundaries assures air tightness without interfering with the light paths. Hermetic seals are placed between the optical components and the chassis 42 to assure air tightness. A cooling fan cools the auxiliary analyzers. Only the rear sides of the reflection liquid crystal panels 11 are exposed to the outside and cooled. Light is reflected by the reflection polarizing plates 10 and cast on the reflection liquid crystal panels 11 and reflected by them. Then the light is analyzed by the reflection polarizing plates 10 and only its effective component is transmitted to the projection lens.

Figure 5:
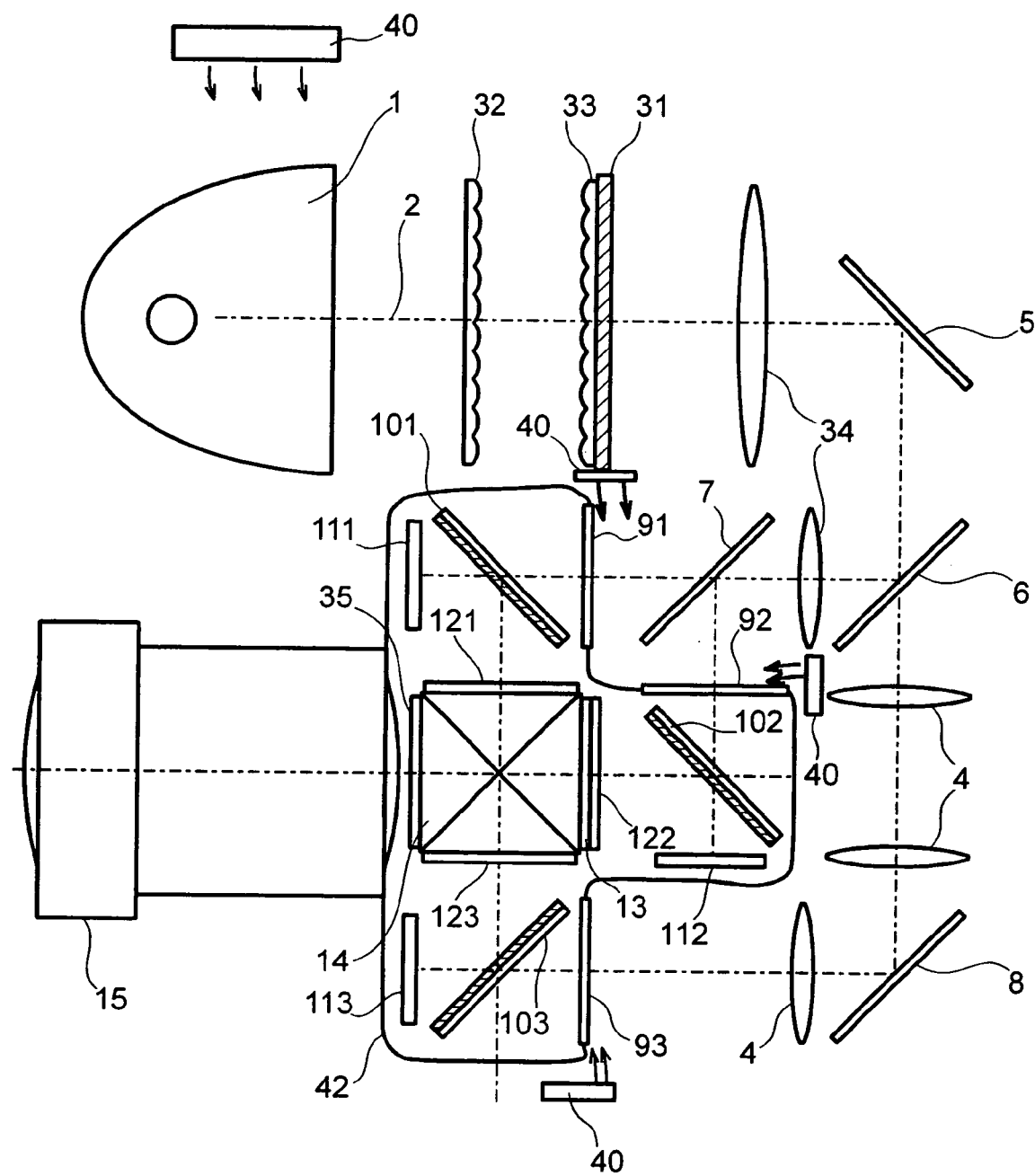
FIG. 5 shows the general structure of a projection type liquid crystal display apparatus according to a fourth embodiment of the present invention.

FIG. 5 shows a fourth embodiment of the present invention. The structure is the same as that of the embodiment illustrated in FIG. 3 except the following points. A color separation system separates light into R, G and B light, which pass through the auxiliary analyzers 91, 92, and 93 and through the reflection polarizing plates 10 and reach the reflection liquid crystal panels 11. The image light modulated and reflected by the reflection liquid crystal panels 11 is reflected by the reflection polarizing plates 10 before entering a color combining prism 14. A hermetically sealed chassis 42 houses the reflection polarizing plates 10, reflection liquid crystal panels 11, cross dichroic prism 14 and auxiliary analyzers 9 and has auxiliary polarizers 9 on its boundaries. A cooling fan cools the auxiliary analyzers 9.

Alternatively, the reflection polarizing plates 10, reflection liquid crystal panels 11, cross dichroic prism 14 and quarter-wave plates 9 may be located on the boundaries of the hermetically sealed chassis 42.

The long sides of the reflection polarizing plates are free and thermally expansible, so deformation due to thermal expansion is minimized and pixel convergence errors on the screen are reduced.

Although the above discussion concerns embodiments which use three reflection liquid crystal panels, the present invention is not limited thereto but may be embodied in the form of a structure which uses one or two reflection liquid crystal panels, with the same effects.

As explained so far, a reflection type liquid crystal projector optical unit or a reflection type liquid crystal projector according to the present invention has the abovementioned basic structure that uses reflection polarizing plates which function as polarizing plates by their grating function only in a specific direction, so that the need for a PBS prism or a quarter-wave plate for PBS prism compensation is eliminated and there is no possibility of interference between the projection lens and the structural components holding the reflection liquid crystal panels. This brings about the effects of contrast improvement and decrease in the number of required components (brightness improvement) without resolution deterioration, thereby realizing a light, compact unit or projector.

The foregoing invention has been described in terms of preferred embodiments. However, those skilled, in the art will recognize that many variations of such embodiments exist. Such variations are intended to be within the scope of the present invention and the appended claims.

What is claimed is:

1. A projection type image display apparatus, comprising:
    a light source unit which emits light;
    three reflective type image display devices, each of which forms an optical image corresponding to an image signal;
    three rectangular-shaped reflective type polarizing plates as polarizers/analyzers for the reflective type image display devices which, by their diffraction function, transmit primary light polarized into a first direction and reflect secondary light polarized into a second direction virtually perpendicular to the first direction and each short side of which is inclined by substantially 45 degrees to an optical axis;
    three auxiliary analyzers, each of which is disposed on a light emitting side of each of said three reflective type polarizing plates, respectively, and transmits the light polarized into said second direction;
    a color separation unit, which separates the light emitted from said light source unit into three color light components; and
    a color combining unit, upon which optical images of said three color light components formed by said reflective type image display devices are incident, respectively and which combines the optical images of said three color light components; and
    a projection lens for projecting a color-combined optical image.

2. The projection type image display apparatus, according to claim 1, wherein each of said reflective type polarizing plates is fixed, contacting a reflection surface side thereof on a holding member with pressure.

3. The projection type image display apparatus, according to claim 1, wherein each of said auxiliary analyzers absorbs the primary light.

4. The projection type image display apparatus, according to claim 1, wherein each of said reflective type polarizing plates comprises an auxiliary polarizer for transmitting the primary light and absorbing the secondary light, on a light incident side thereof.

5. The projection type image display apparatus, according to claim 1, wherein:
    each of the rectangular-shaped reflective type polarizing plates, by its diffraction function, transmits one of the three color light components as the primary light toward a respective one of the three reflective type image display devices; and
    each of the reflective type polarizing plates, by its reflection function, reflects light of the optical image formed by the respective reflective type image display device as the secondary light through one of the auxiliary analyzers to the color combining unit.

6. A projection type image display apparatus, comprising:
    a light source unit which emits light;
    a color separation unit, which separates the light emitted from said light source unit into three color light components;
    three sets of reflective type image display devices, reflective type polarizer plates and auxiliary analyzers,
    each reflective type image display device forming an optical image corresponding to one of said three color light components, and
    each reflective type polarizer plate of a plate type, having a rectangular shape, as polarizer/analyzer for the reflective type image display device which, by diffraction function, transmits primary light polarized in a specified direction and reflects secondary light polarized in a direction virtually perpendicular to the specified direction and short side of which is included by substantially 45 degrees to an optical axis;
    a color combining unit, upon which optical images formed of said three color light components are incident, respectively, after each being reflected upon said reflective type polarization plate and transmitting through said auxiliary analyzer; and
    a projection lens for projecting a color-combined optical image.

7. The projection type image display apparatus, according to claim 6, wherein each of said reflective type polarizing plates is fixed, contacting a reflection surface side thereof on a holding member with pressure.

8. The projection type image display apparatus, according to claim 6, wherein each of said auxiliary analyzers absorbs the primary light.

9. The projection type image display apparatus, according to claim 6, wherein each of said reflective type polarizing plates comprises an auxiliary polarizer for transmitting the primary light and absorbing the secondary light.

10. The projection type image display apparatus, according to claim 6, wherein:
    each of the reflective type polarizing plates, by its diffraction function, transmits one of the three color light components as the primary light toward a respective one of the three reflective type image display devices; and
    each of the rectangular-shaped reflective type polarizing plates, by its reflection function, reflects light of the optical image formed by the respective reflective type image display device as the secondary light through one of the auxiliary analyzers to the color combining unit.

* * * * *